(12) United States Patent
Warashina

(10) Patent No.: US 8,161,839 B2
(45) Date of Patent: Apr. 24, 2012

(54) ELECTRICALLY POWERED TILT STEERING DEVICE

(75) Inventor: Toshihiko Warashina, Shizuoka (JP)

(73) Assignee: Fuji Kiko Co., Ltd., Kosai-shi (JP)

( * ) Notice: Subject to any disclaimer, the term of this patent is extended or adjusted under 35 U.S.C. 154(b) by 821 days.

(21) Appl. No.: 12/236,158

(22) Filed: Sep. 23, 2008

(65) Prior Publication Data

US 2009/0100956 A1    Apr. 23, 2009

(30) Foreign Application Priority Data

Oct. 19, 2007    (JP) .................................. 2007-271937

(51) Int. Cl.
*B62D 1/18*    (2006.01)
(52) U.S. Cl. ......................................................... 74/493
(58) Field of Classification Search .................... 74/492, 74/493; 280/775, 777
See application file for complete search history.

(56) References Cited

U.S. PATENT DOCUMENTS

| | | | | |
|---|---|---|---|---|
| 4,335,625 A | * | 6/1982 | Nishikawa | 74/493 |
| 4,633,732 A | * | 1/1987 | Nishikawa et al. | 74/493 |
| 4,739,673 A | * | 4/1988 | Ishikawa et al. | 74/493 |
| 4,785,684 A | * | 11/1988 | Nishikawa et al. | 74/493 |
| 5,036,720 A | * | 8/1991 | Shirasawa et al. | 74/441 |
| RE34,359 E | * | 8/1993 | Matsumoto et al. | 74/493 |
| 6,079,743 A | * | 6/2000 | Grams | 280/775 |
| 6,637,771 B2 | * | 10/2003 | Yoshimoto | 280/775 |
| 7,191,679 B2 | * | 3/2007 | Tomaru et al. | 74/493 |
| 7,226,082 B2 | * | 6/2007 | Muramatsu et al. | 280/775 |
| 2002/0124677 A1 | | 9/2002 | Tomaru et al. | |
| 2007/0137381 A1 | * | 6/2007 | Arihara | 74/493 |
| 2008/0216597 A1 | * | 9/2008 | Iwakawa et al. | 74/493 |
| 2009/0256341 A1 | * | 10/2009 | Okada et al. | 280/775 |

FOREIGN PATENT DOCUMENTS

| | | | |
|---|---|---|---|
| DE | 4344681 A1 | * | 7/1994 |
| EP | 0 213 482 A2 | | 3/1987 |
| EP | 402133 A1 | * | 12/1990 |
| EP | 0 834 437 A2 | | 4/1998 |
| JP | 2007-83992 A | | 4/2007 |

* cited by examiner

*Primary Examiner* — Thomas R Hannon
*Assistant Examiner* — Alan Waits
(74) *Attorney, Agent, or Firm* — Foley & Lardner LLP

(57) ABSTRACT

A jacket unit for a steering shaft is pivotally connected to a vehicle body through a first pivot mechanism and a swing arm is pivotally connected to the vehicle body through a second pivot mechanism. A first free part of the swing arm is pivotally connected to the jacket unit. A first screw rod member is rotatably held by the jacket unit and has a first splined end portion. A nut member is operatively engaged with the first screw rod member and pivotally connected to a second free part of the swing arm. A holding structure is provided for rotatably holding one end of the first screw rod member on the jacket unit. An electric actuator is held by the jacket unit and includes an output shaft that has a second splined end portion. The first splined end portion is operatively engaged with the second splined end portion to achieve a united rotation of the output shaft and the first screw rod member while permitting an axial movement relative to each other.

11 Claims, 8 Drawing Sheets

ELECTRICALLY POWERED TILT STEERING DEVICE

BACKGROUND OF THE INVENTION

1. Field of the Invention

The present invention relates in general to tilt steering devices for wheeled motor vehicles, and more particularly to the tilt steering devices of an electrically powered type, which tilt a steering shaft with electric power. The steering devices of this type will be referred to an electrically powered tilt steering device in the following.

2. Description of the Related Art

Hitherto, in the field of wheeled motor vehicles, various types of electrically powered tilt steering devices have been proposed and put into practical use. In such tilt steering devices, an electric motor is used for driving a tilting mechanism incorporated with a steering device.

In order to clarify the task of the present invention, one of hitherto proposed electrically powered tilt steering devices will be briefly described in the following, which is disclosed in Japanese Laid-open Patent Application (Tokkai) 2007-83992.

In the electrically powered tilt steering device of the publication, there is employed an electrically powered tilting mechanism that changes the height (or angular position) of a steering wheel on a steering shaft (or steering column) with electric power. That is, tilting of the steering wheel is carried out by the electrically powered tilting mechanism.

The known electrically powered tilt mechanism comprises a jacket unit that rotatably receives therein a steering shaft that has a steering wheel connected to a top thereof. The jacket unit is pivotally supported by a vehicle body through a pivot mechanism. A swing arm is pivotally connected to the vehicle body through another pivot mechanism. A first free part of the swing arm is pivotally connected to the jacket unit. A screw rod member is rotatably held by the jacket unit through first and second holding structures, and a nut member is operatively engaged with the screw rod member, so that rotation of the screw rod member about an axis thereof induces an axial movement of the nut member on and along the screw rod member. The nut member is pivotally connected to a second free part of the swing arm. One end of the screw rod member is driven by an electric motor through a speed reduction unit.

For rotatably mounting the screw rod member on the jacket unit, the first holding structure that is to be placed near the motor driven end of the screw rod member is assembled, then the second holding structure that is to be placed away from the motor driven end of the first threaded rod member is assembled, then the screw rod member is put into the assembled first and second holding structures, and then, an externally threaded retainer is screwed into a threaded bore of the second holding structure to retain a bearing in the second holding structure. With these steps, the screw rod member is rotatably held by the first and second holding structures.

SUMMARY OF THE INVENTION

However, the known electrically powered tilt mechanism tends to have the following drawbacks due to its inherent construction. That is, in the known mechanism, the first and second holding structures are constructed to suppress an axial movement of the screw rod member.

Accordingly, when the externally threaded retainer is screwed into the threaded bore of the second holding structure with a certain force, a tightening force produced by the retainer causes the screw rod member to be compressed in an axial direction between the first and second holding structures, which tends to produce a resistance against a rotation of the screw rod member. If the tightening force is high, the resistance against the rotation becomes high and thus in such case, smoothed rotation of the screw rod member is not expected. Of course, if the tightening force is insufficient, the screw rod member is subjected to a undesired axial play. Furthermore, when, due to a collision of a driver against the steering wheel upon a vehicle collision or the like, a marked force is applied to the screw rod member through the swing arm and the nut member, the force is directly transmitted to an output part of the electric motor, which tends to cause a trouble of the electric motor. Furthermore, in the known mechanism, the work for assembling the mechanism is complicated because of increase in assembling steps.

Accordingly, it is an object of the present invention to provide an electrically powered tilt steering device which is free of the above-mentioned drawbacks.

In accordance with the present invention, there is employed an improved reciprocatively actuating mechanism for tilting a jacket unit. The actuating mechanism comprises a first screw rod member whose rotation about its axis induces a tilting movement of the jacket unit, and an electric actuator that has an output shaft. The first screw rod member and the output shaft are coaxially connected to each other through a spline connection. Due to provision of the spline connection, the first screw rod member and the output shaft can rotate together about their common axis while being permitted to make an axial movement therebetween.

In accordance with a first aspect of the present invention, there is provided an electrically powered tilt steering device of a motor vehicle, which comprises a jacket unit that rotatably receives therein a steering shaft, the jacket unit being pivotal relative to a vehicle body through a first pivot mechanism; a swing arm that is pivotally connected to the vehicle body through a second pivot mechanism, a first free part of the swing arm being pivotally connected to the jacket unit; a first screw rod member rotatably held by the jacket unit, the first screw rod member having a first splined end portion; a nut member operatively engaged with the first screw rod member so that rotation of the first screw rod member about an axis thereof induces a movement of the nut member on and along the first screw rod member, the nut member being pivotally connected to a second free part of the swing arm; a holding structure for rotatably holding one end of the first screw rod member on the jacket unit; and an electric actuator held by the jacket unit and including an output shaft that has a second splined end portion, wherein the first splined end portion is operatively engaged with the second splined end portion to achieve a united rotation of the output shaft and the first screw rod member while permitting an axial movement relative to each other.

In accordance with a second aspect of the present invention, there is provided an electrically powered tilt steering device of a motor vehicle, which comprises a jacket unit that rotatably receives therein a steering shaft, the jacket unit including an outer jacket that is pivotal relative to a vehicle body through a first pivot mechanism and an inner jacket that is telescopically connected with the outer jacket; a swing arm that is pivotally connected to the vehicle body through a second pivot mechanism, a first free part of the swing arm being pivotally connected to the outer jacket of the jacket unit; a first screw rod member rotatably held by the outer jacket of the jacket unit, the first screw rod member having a first splined end portion; a nut member operatively engaged with the first screw rod member so that rotation of the first screw rod member about an axis thereof induces a movement of the nut member on and along the first screw rod member, the nut member being pivotally connected to a second free part of the swing arm; a holding structure for rotatably holding one end of the first screw rod member on the outer jacket of the jacket unit; an electric actuator held by the outer jacket of the jacket unit and including an output shaft that has a second splined end portion, the first splined end portion being operatively engaged with the second splined end portion to achieve a united rotation of the output shaft and the first screw rod member while permitting an axial movement relative to each other; a threaded opening formed in the holding structure; a second screw rod member operatively engaged with the threaded opening, so that rotation of the second screw rod member about its axis induces an axial movement thereof relative to the holding structure; an elongate opening provided in the first screw rod member to receive a leading end portion of the second screw rod member; another electric actuator held by the inner jacket of the jacket unit through a bracket unit, the electric actuator, upon energization, driving the second screw rod member through a speed reduction unit.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, an electrically powered tilt steering device of the present invention will be described in detail with reference to the accompanying drawings.

For ease of understanding, various directional terms, such as, right, left, upper, lower, rightward and the like are used in the following description. However, such terms are to be understood with respect to only a drawing or drawings on which a corresponding part or portion is shown.

As will be understood from the following description, the electrically powered tilt steering device of the present invention is described as a unit that has a telescopic mechanism incorporated therewith.

Figure 5:
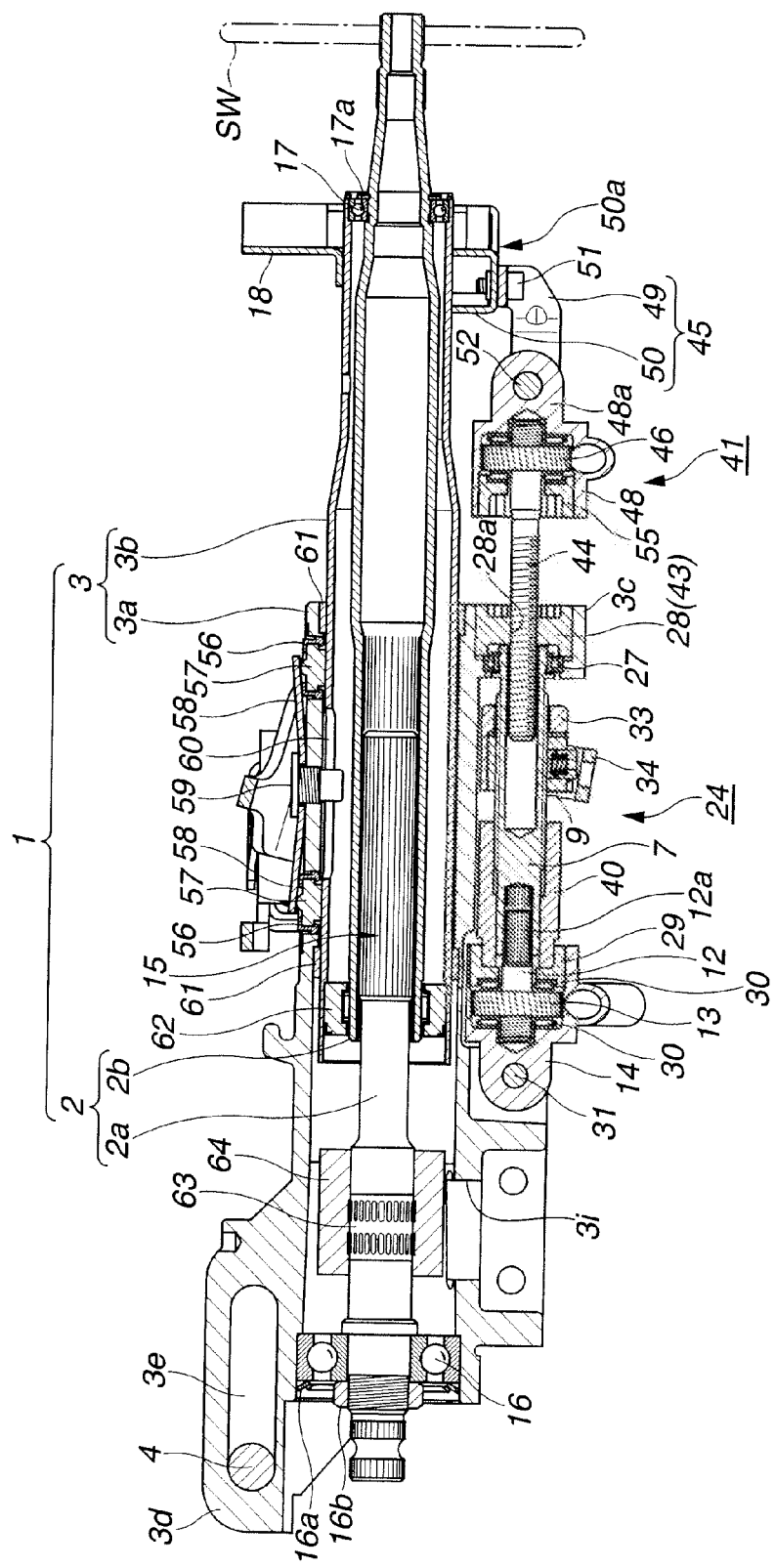
FIG. 5 is a sectional view of the electrically powered tilt steering device of the present invention in an assembled condition.

Referring to FIG. 5, there is shown in a sectional manner an electrically powered tilt steering device of the present invention, which has a telescopic type steering column incorporated therewith.

In the drawing, denoted by numeral 2 is a steering shaft whose right end has a steering wheel SW mounted thereto. As shown, the steering shaft 2 is rotatably received in a jacket unit 3 to constitute a steering column 1.

The steering shaft 2 comprises an inner solid shaft 2a and an outer hollow shaft 2b that is axially movably disposed on the inner solid shaft 2a through a spline connection portion 15. As shown, the outer hollow shaft 2b has a right end to which the steering wheel SW is mounted.

The jacket unit 3 comprises an outer jacket 3a that rotatably supports therein the inner solid shaft 2a and an inner jacket 3b that rotatably supports therein the outer hollow shaft 2b.

As is seen in the drawing, viz., FIG. 5, within a left end portion of the outer jacket 3a, there is disposed a ball bearing 16 for rotatably holding the inner solid shaft 2a in the outer jacket 3a. For retaining the ball bearing 16 at a given position in the outer jacket 3a, a bush nut 16a and a lock nut 16b are used.

For rotatably supporting the outer hollow shaft 2b in the inner jacket 3b, the inner jacket 3b has at left and right inner portions thereof front and rear bearings 62 and 17 that rotatably support the outer hollow shaft 2b. For retaining the rear bearing 17 at a given position of the outer hollow shaft 2b, a C-ring 17a is used.

For permitting axial or telescopic movement of the inner jacket 3b relative to the outer jacket 3a, there is arranged therebetween a guide means (no numeral) which has the following construction.

Figure 4:
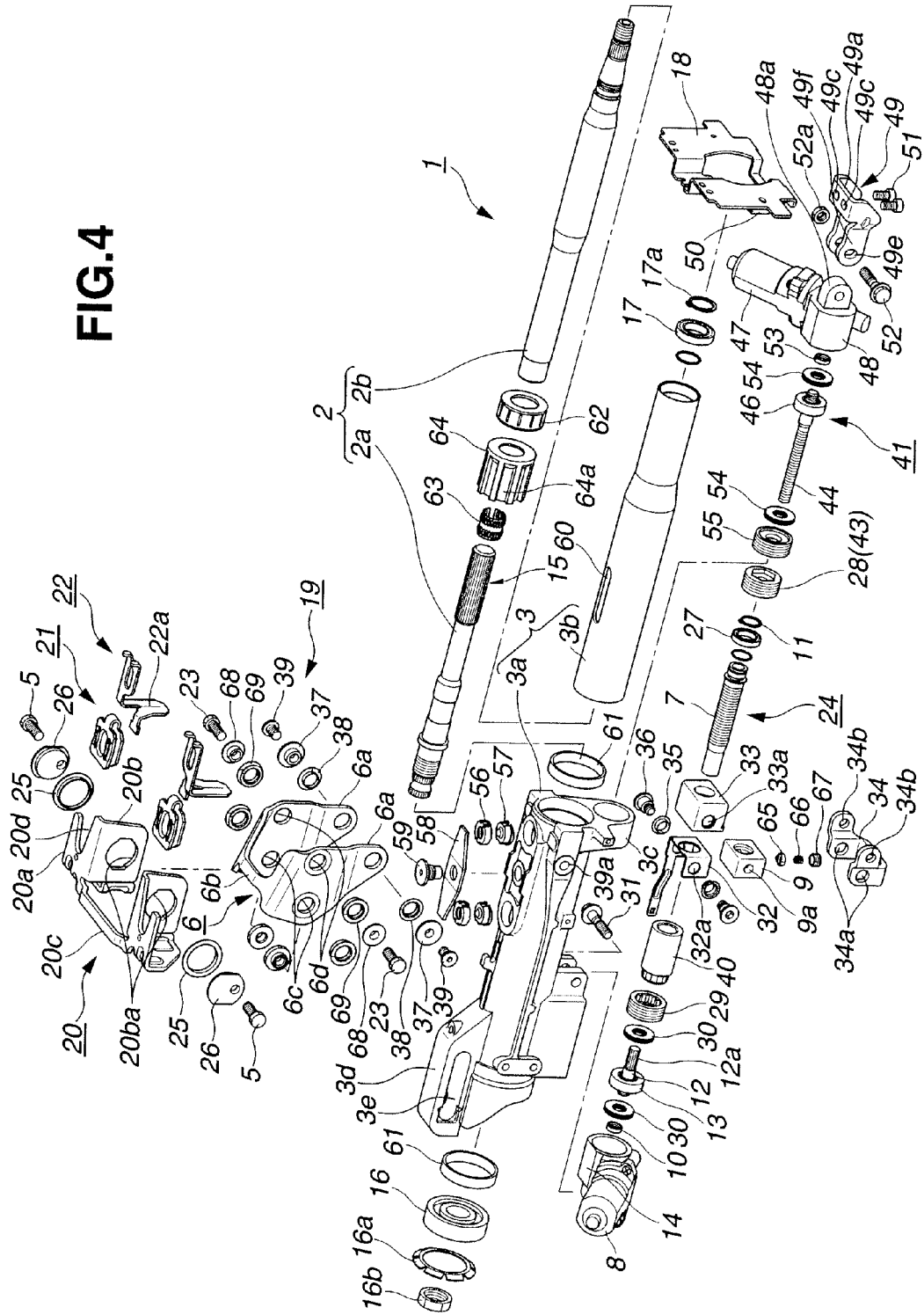
FIG. 4 is an exploded view of the electrically powered tilt steering device of the present invention.

That is, as is seen from FIG. 4, the outer jacket 3a is formed at its right end portion with two openings (no numerals) into which respective seat jackets 57 are inserted through respective spacer jackets 56. In order to bias the seat jackets 57 downward, there is employed a leaf spring 58 that is connected to the outer jacket 3a by means of an adjusting screw 59. That is, when the leaf spring 58 is pressed toward the outer jacket 3a by the screw 59, wing portions of the leaf spring 58 function to press the seat jackets 57 downward.

As will be understood from FIG. 4, the leading (or lower) end of the adjusting screw 59 is slidably received in an elongate slot 60 that is formed in the inner jacket 3b.

As is understood from FIG. 5, at axially spaced two positions between the outer jacket 3a and the inner jacket 3b which are near the respective seat jackets 57, there are operatively arranged respective bushes 61.

To a right end of the inner jacket 3b, there is fixed a panel 18 on which a combination switch (not shown) and the like are mounted.

At a left end portion (in FIG. 5) of the inner solid shaft 2a, there is arranged a key lock means that is capable of locking the inner solid shaft 2a. For this key lock means, the outer jacket 3a is formed with a slot 3i in which a locking bar (no numeral) is received. The inner solid shaft 2a is provided at a portion facing the slot 3i with a lock collar 64 through a spring slip 63.

As is well shown in FIG. 4, the lock collar 64 is formed on a cylindrical outer surface thereof with a plurality of recesses 64a. Upon operation of the key lock means, the above-mentioned locking bar is inserted into either one of the recesses 64a to lock the inner solid shaft 2a.

As is seen in FIG. 5, at a left upper portion of the outer jacket 3a, there is formed a shaft holding portion 3d that is formed with an axially extending slot 3e.

Slidably engaged with the axially extending slot 3e is a first pivot shaft 4 that extends laterally in a vehicle body and is tightly fixed to the vehicle body. Due to the slidable engagement between the slot 3e and the fixed first pivot shaft 4, the jacket unit 3 is movable in a rightward and leftward direction in FIG. 5 relative to the fixed first pivot shaft 4 by a distance corresponding to the length of the slot 3e. In other words, when the tilt steering device is properly mounted in the vehicle body, the jacket unit 3 is swingably movable upward and downward.

As is seen from FIG. 4, for adjusting a tilting angle of the jacket unit 3 that is swingably and movably supported in the above-mentioned manner, there is arranged a tilting mechanism 19 at an upper portion of the outer jacket 3a.

As shown, the tilting mechanism 19 comprises a generally U-shaped upper bracket 20 that is fixed to the vehicle body.

The U-shaped upper bracket 20 comprises two wing portions 20a that are to be secured to the vehicle body, two side bracket portions 20b that extend downward from the two wing portions 20a respectively, and a bridge portion 20c that extends between the two wing portions 20a.

As is seen from the drawing (viz., FIG. 4), each wing portion 20a is formed with a cut 20d whose open end faces rearward of the vehicle. By engaging mounting flanges 21 with the cuts 20d of the wing portions 20a and using mounting bolts (not shown), the U-shaped upper bracket 20 is tightly mounted to the vehicle body.

In order to absorb a shock produced when the vehicle is subjected to a vehicle collision or the like, there are employed shock absorbing members 22 each being arranged to connect the bracket 20 and the corresponding mounting bolt. Actually, due to provision of the cuts 20d, the bracket 20 tends to disengage from the vehicle body upon a vehicle collision. For absorbing the shock, each shock absorbing member 22 is formed with a cut line 22a. When, due to the vehicle collision, a big shock is applied to the shock absorbing members 22, each shock absorbing member 22 is broken or torn up along the cut line 22a while absorbing the shock.

As is shown in the drawing (viz., FIG. 4), a generally U-shaped swing arm 6 is swingably disposed between the side bracket portions 20b of the upper bracket 20. The U-shaped swing arm 6 puts therein the upper portion of the outer jacket 3a. As shown, the U-shaped swing arm 6 comprises a pair of arm portions 6a and a bridge portion 6b that extends between the pared arm portions 6a.

Figure 6:
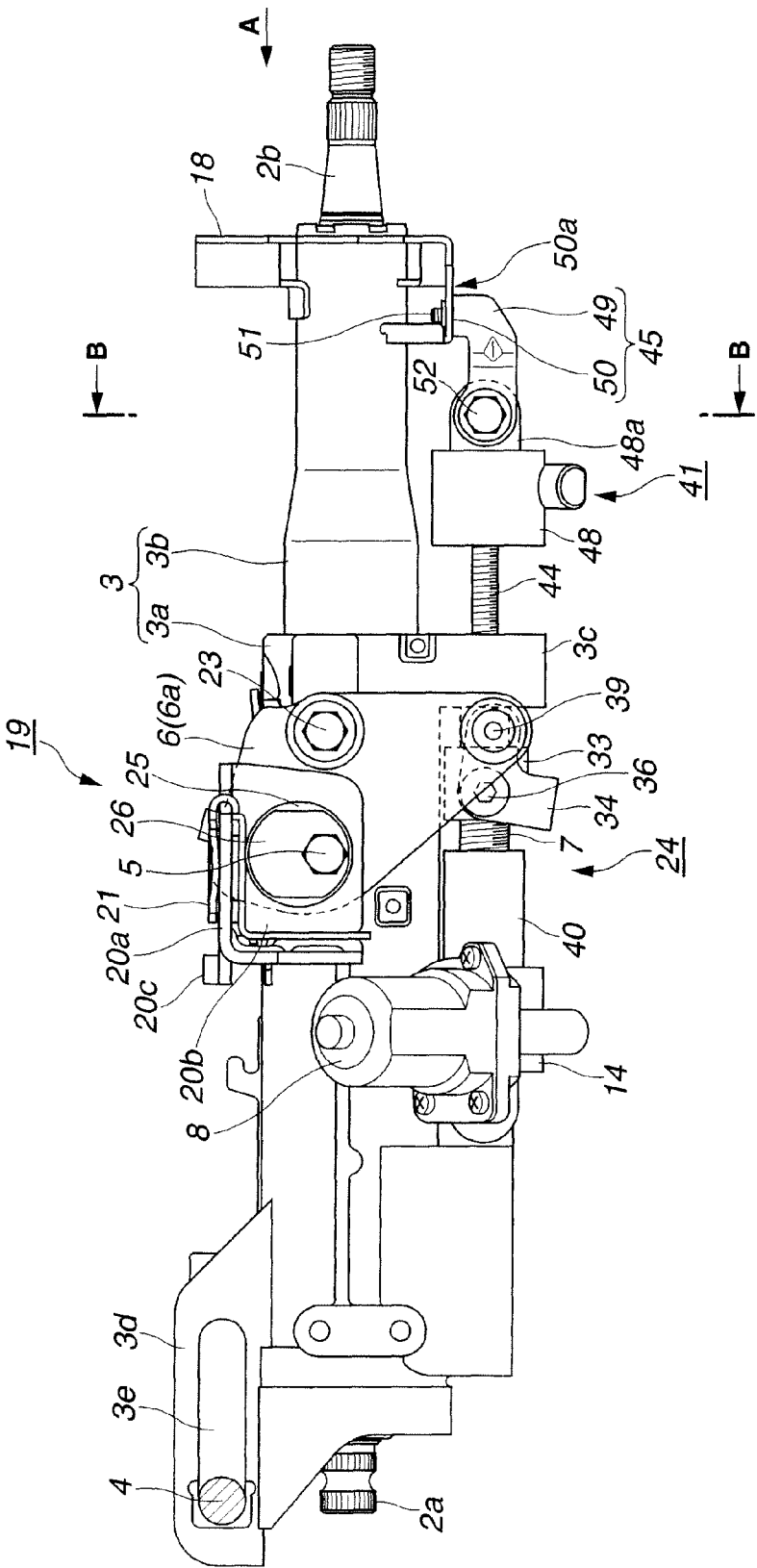
FIG. 6 is a side view of the electrically powered tilt steering device of the present invention.
Figure 7:
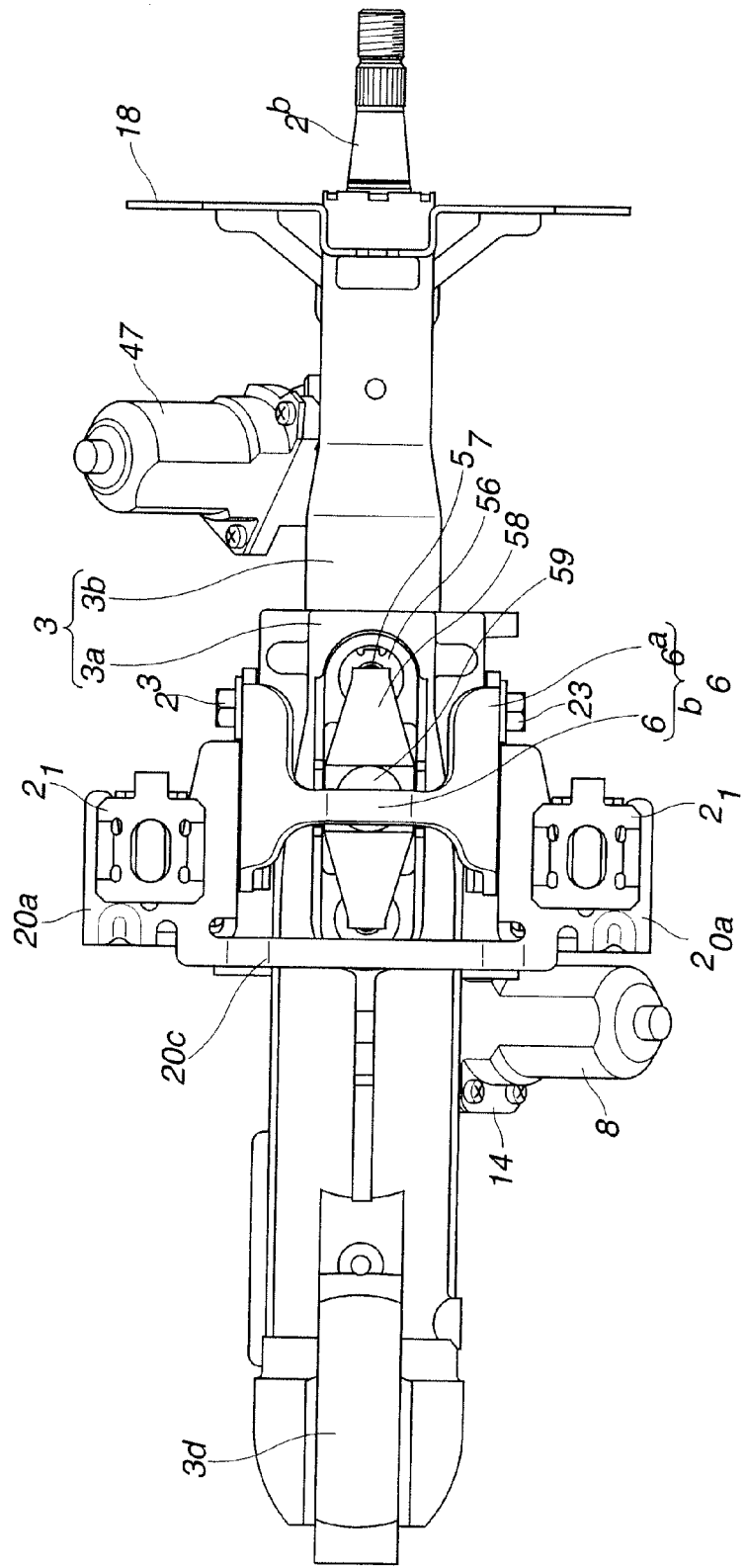
FIG. 7 is a plan view of the electrically powered tilt steering device of the present invention.

As is seen from FIGS. 6, 7 and 4, the U-shaped swing arm 6 is swingably held by the upper bracket 20 through a pair of second pivot shafts 5.

As is seen from FIG. 4, the second pivot shafts 5 pass through larger openings 20ba formed in the side bracket portions 20b of the upper bracket 20 and smaller openings 6c formed in the arm portions 6a of the swing arm 6.

To the U-shaped swing arm 6, there is pivotally connected a given part of the outer jacket 3a through a pair of pivot units, each pivot unit including a first threaded shaft 23, a collar member 68 and a bush 69. For this swing connection, smaller openings 6d formed in the arm portions 6a of the swing arm 6 and threaded openings 39a formed in opposed side walls of the given part of the outer jacket 3a are used, which are incorporated with the paired pivot units.

As is seen from FIG. 6, the U-shaped swing arm 6 is connected with a reciprocatively actuating mechanism 24 to be swingably actuated.

As is seen from FIG. 4, for permitting both the swing movement of the outer jacket 3a about the first pivot shaft 4 and the swing movement of swing arm 6 about the second pivot shaft 5, circular discs 26 are incorporated with the larger openings 20ba of the side bracket portions 20b of the U-shaped upper bracket 20 through respective bush rings 25. That is, each circular disc 26 is rotatably received in the corresponding larger opening 20ba, and each circular disc 26 is formed with an eccentric opening (no numeral) through which the corresponding second pivot shaft 5 is passed.

As is seen from FIG. 4, the reciprocatively actuating mechanism 24 comprises a first screw rod member 7 that is rotatably supported by the outer jacket 3a and extends along the outer jacket 3a. For the reasons that will become apparent hereinafter, both ends of the first screw rod member 7 are hollow in construction. The first screw rod member 7 is driven by an electric motor 8 as will be described in detail hereinafter.

A nut member 9 is operatively engaged with the first screw rod member 7, so that rotation of the first screw rod member 7 about its axis induces forward or backward movement of the nut member 9 on and along the first screw rod member 7. The nut member 9 is pivotally connected to a lower portion of the above-mentioned U-shaped swing arm 6.

As is clearly seen from FIG. 5, the hollow right end portion of the first screw rod member 7 is rotatably held by a shaft supporting portion 3c of the outer jacket 3a through a radial bearing 27.

Figure 1:
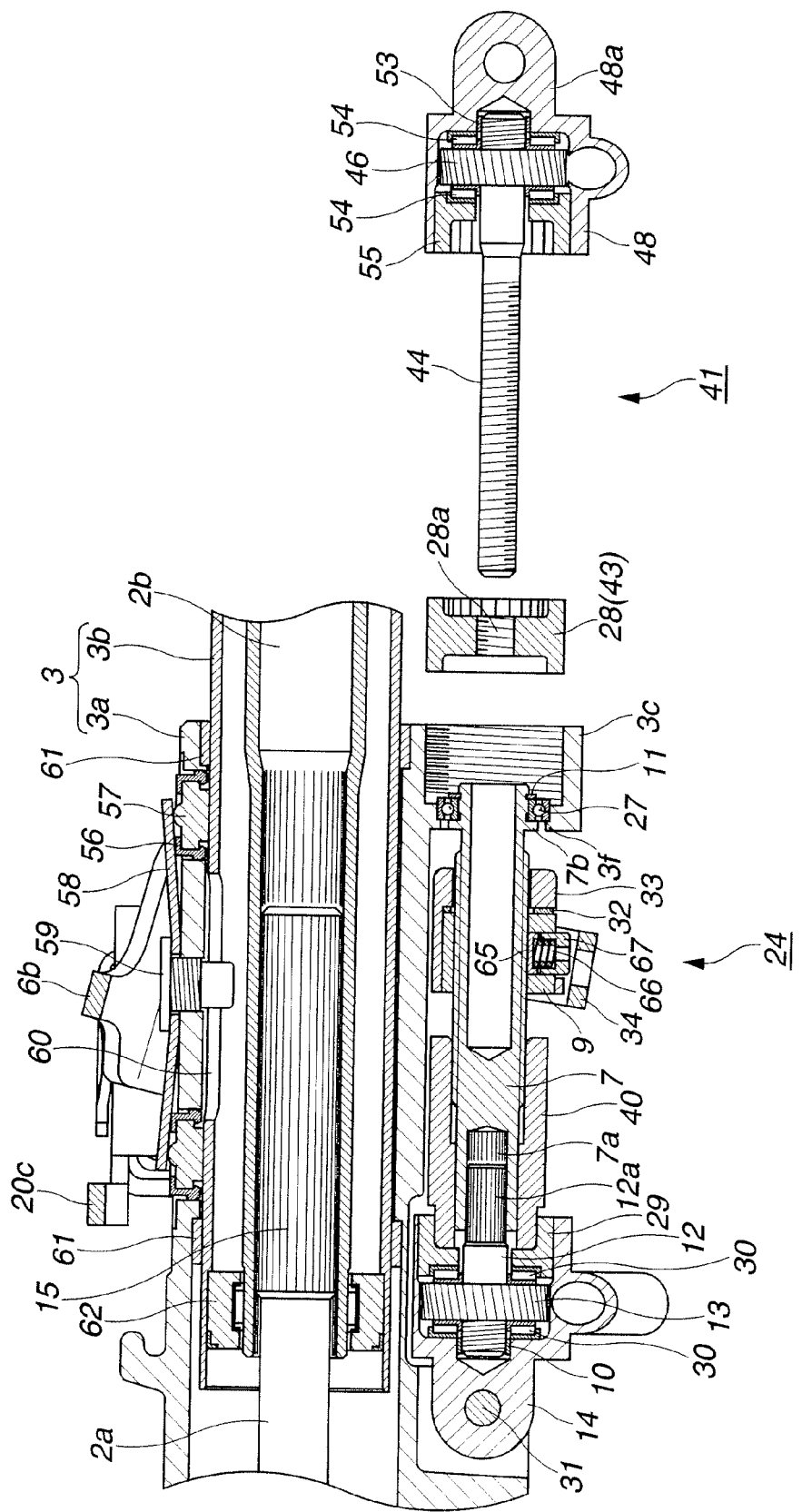
FIG. 1 is a partially exploded sectional view of an essential part of an electrically powered tilt steering device of the present invention.

That is, as is seen from FIG. 1, in an opening (no numeral) formed in the shaft supporting portion 3c of the outer jacket 3a, there is tightly put the radial bearing 27. The radial bearing 27 is tightly sandwiched between an annular ridge 3f that is formed on an inner wall of the opening of the shaft supporting portion 3c and an annular bearing retainer 28 that is screwed into the opening of the shaft supporting portion 3c.

Due to provision of an annular ridge 7b formed on a right end portion of the first screw rod member 7 and a C-ring 11 provided on the right end of the first screw rod member 7, the radial bearing 27 tightly put therebetween functions to suppress an axial movement of first screw rod member 7. More specifically, due to provision of the annular bearing retainer 29 to which the right end of the first screw rod member 7 contacts, an axial movement of the rod member 7 in a direction away from the worm wheel 13 is suppressed. As shown, the hollow formed in the left end portion of the first screw rod member 7 is formed with a splined cylindrical inner surface 7a.

Figure 2:
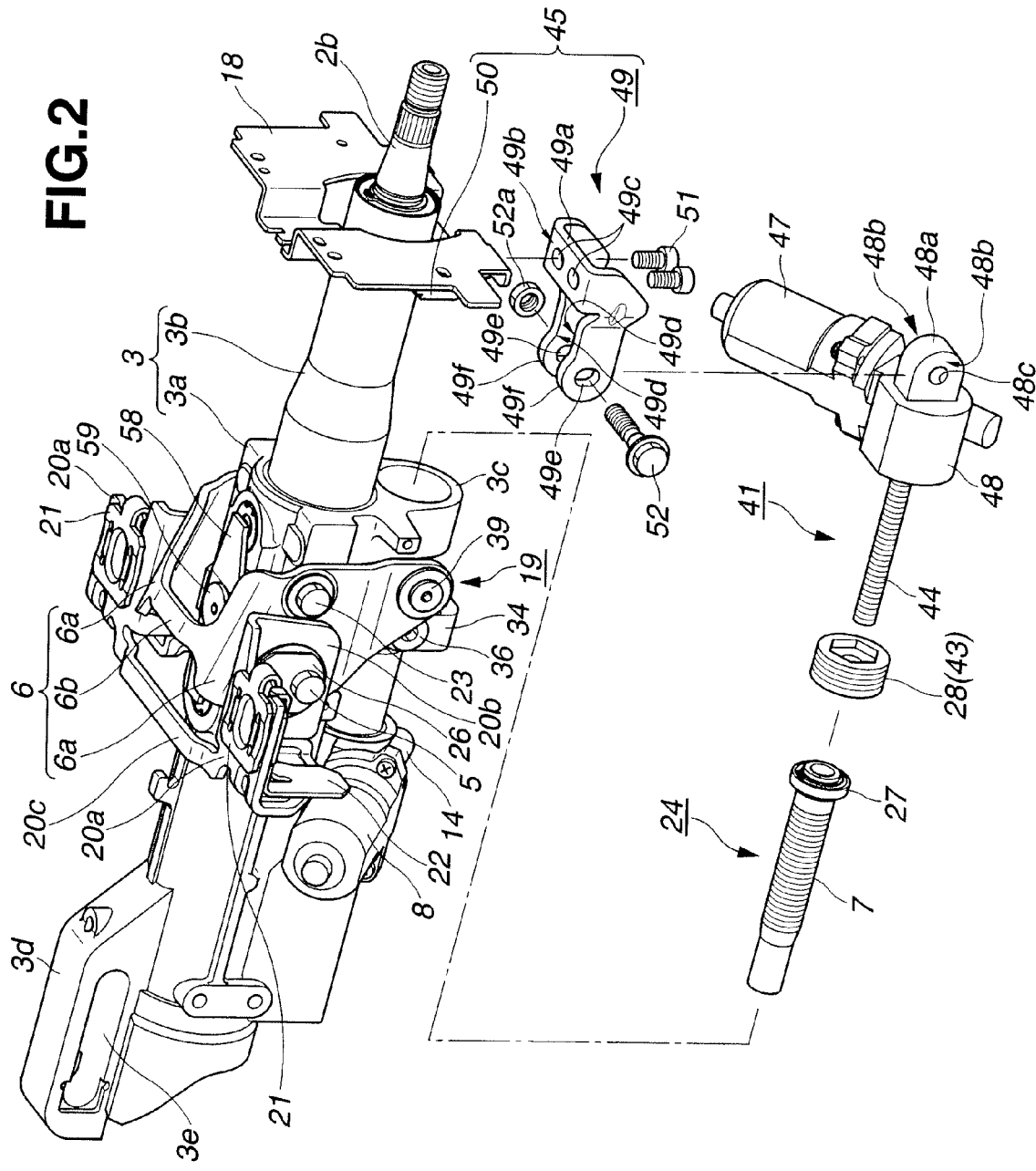
FIG. 2 is a partially exploded perspective view of the electrically powered tilt steering device of the present invention.

As is shown in FIGS. 1 and 2, to a lower middle portion of the outer jacket 3a, there is connected a motor case 14 through a bolt 31. Within the motor case 14, there are installed the above-mentioned electric motor 8 (see FIG. 2) and a speed reduction unit that includes a worm (not shown) provided on an output shaft of the motor 8 and a worm wheel 13. The motor 8 drives the speed reduction unit.

An output shaft 12 of the worm wheel 13 is formed with a splined cylindrical outer surface 12a. The worm wheel 13 is rotatably held in the motor case 14 through a bearing bush 10 and a pair of thrust bearings 30. An annular bearing retainer 29 is screwed into the motor case 14 to properly hold the worm wheel 13 in the motor case 14.

The worm provided on the output shaft of the electric motor 8 is meshed with the worm wheel 13. As shown, the splined cylindrical outer surface 12a of the output shaft 12 of the worm wheel 13 is engaged with the splined cylindrical inner surface 7a of the first screw rod member 7 by means of a spline connection.

Thus, as is understood from FIG. 1, when the electric motor 8 is energized, the first screw rod member 7 is rotated at a reduced rotation speed through the speed reduction unit while permitting a mutual axial movement between the output shaft 12 and the first screw rod member 7. The rotation of the first screw rod member 7 induces an axial movement of the nut member 9 on and along the first screw rod member 7.

As is mentioned hereinabove and as will be understood from FIGS. 4 and 6, the nut member 9 is connected to the lower portion of the U-shaped swing arm 6 through a link mechanism.

That is, as is seen from FIG. 4, the nut member 9 is installed in a rectangular parallelepiped stopper 33 through a protector 32. A generally U-shaped link member 34 puts therein the stopper 33. More specifically, side wall portions of the link member 34 put therebetween the stopper 33.

With the aid of a pair of connecting bolts 36, the nut member 9, protector 32, stopper 33 and link member 34 are united to constitute a united body. Each connecting bolt 36 is inserted into aligned openings 32a, 33a and 34a of the protector 32, stopper 33 and link member 34 and screwed into a threaded opening 9a of the nut member 9. For assuring the connection by the connecting bolt 36, a bush 35 is used.

The united body thus constituted has a through bore (no numeral) through which the first screw rod member 7 passes. Of course, the nut member 9 constituting part of the united body is operatively engaged with the first screw rod member 7.

In order to remove or at least minimize undesired play of the nut member 9 relative to the first screw rod member 7, a play suppressing means is employed, which comprises an opening formed in a lower wall portion of the nut member 9 and exposed to the outer surface of the first screw rod member 7, a seat screw 65 put in the opening, a screw lid 67 screwed to a threaded mouth part of the opening and a coil spring 66 compressed between seat screw 65 and the screw lid 67 to press the seat screw 65 against the outer surface of the first screw rod member 7.

As is seen from FIG. 4, the U-shaped link member 34 is formed with aligned openings 34b at the side wall portions thereof. Pivotally connected to these aligned openings 34b are lower parts of the paired arm portions 6a of the U-shaped swing arm 6 through a pair of pivot units, each pivot unit including an opening (no numeral) that is formed in the arm portion 6a and a second pivot shaft 39 that is threaded into the opening through a collar member 37 and a bush 38. In the link member 34, the distance between one opening 34a and the corresponding opening 34b is essential for providing the link member 34 with a link function.

Due to the connection between the nut member 9 and the lower portion of the U-shaped swing arm 6 by the link member 34, the swing arm 6 is permitted to turn about the second pivot shaft 39 and at the same time permitted to move straightly. Thus, a gap in the traveling direction of the nut member 9 and the swing arm 6 is suitably absorbed.

In order to suppress excessive forward movement of the nut member 9, a tubular stopper member 40 is provided in a manner to cover the first screw rod member 7. A left end of the tubular stopper member 40 is tightly disposed in a bearing retainer 29.

As is mentioned hereinabove, and as will be understood from FIG. 4, the outer hollow shaft 2b is axially movably disposed on the inner solid shaft 2a. For adjusting an axial position of the outer hollow shaft 2b relative to the inner solid shaft 2a, a telescopic mechanism 41 is employed.

The detailed construction of the telescopic mechanism 41 will be described in the following.

As is seen from FIG. 1, in a center portion of the annular bearing retainer 28 that constitutes part of the reciprocatively actuating mechanism 24 of the tilting mechanism 19, there is formed an internal thread 28a which functions as a fixing nut 43 fixed to the above-mentioned outer jacket 3a.

As is seen from FIG. 1, meshed with the fixing nut 43 is a second screw rod member 44 which extends generally in parallel with an axis of the above-mentioned inner jacket 3b.

As will be understood from FIG. 5, the right end of the second screw rod member 44 is rotatably held by a lower portion of the inner jacket 3b through a bracket unit 45. The right end of the second screw rod member 44 is driven by an electric motor 47 through a speed reduction unit that comprises a worm provided on an output shaft of the motor 47 and a worm wheel 46 meshed with the worm.

Figure 3A:
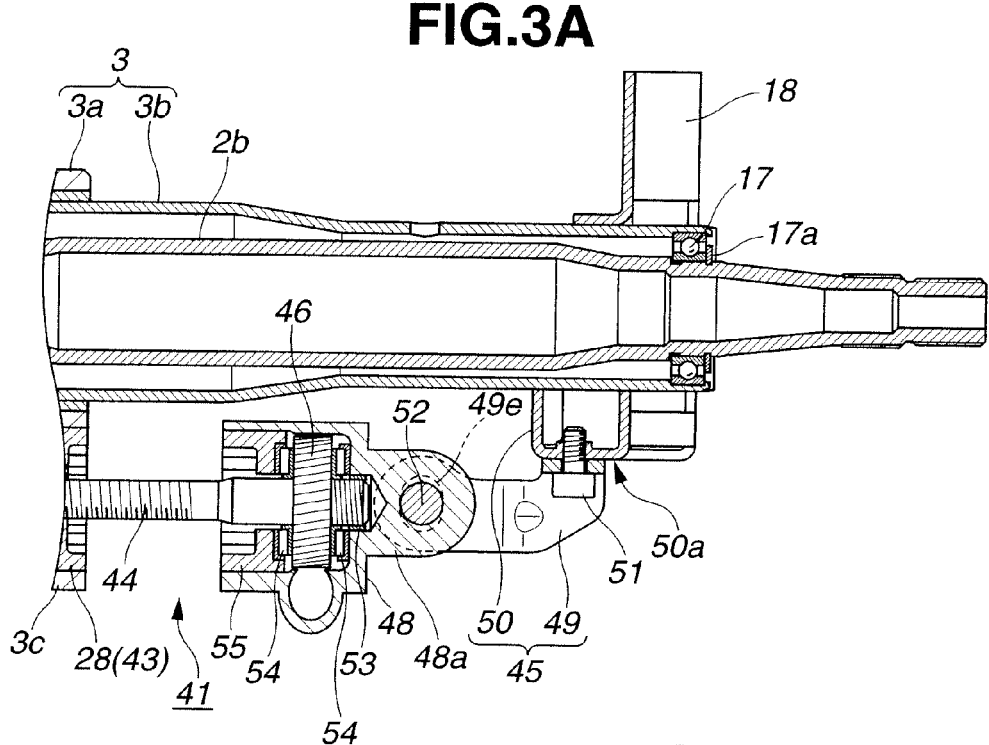
FIG. 3A is a sectional view of a part of the electrically powered tilt steering device of the present invention where a telescopic mechanism is arranged.
Figure 3B:
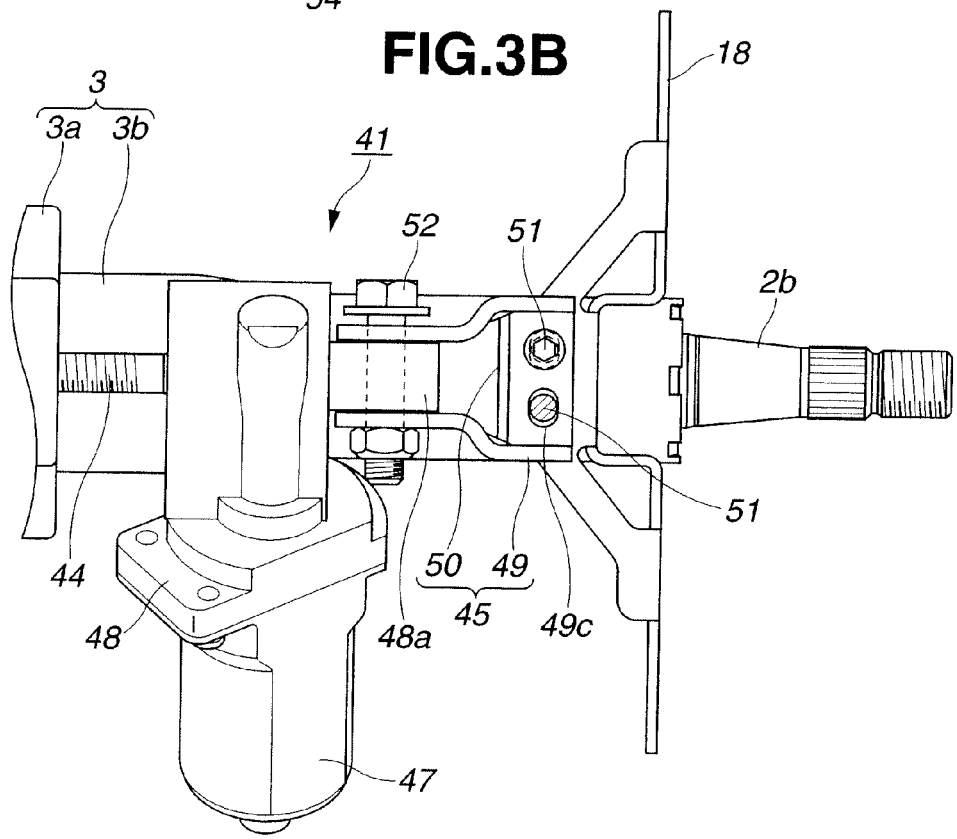
FIG. 3B is a bottom view of the part of the electrically powered tilt steering device of the present invention where the telescopic mechanism is arranged.

As is well shown in FIGS. 3A and 3B, a motor case 48 as a shaft supporting member is connected to the inner jacket 3b through the bracket unit 45. The electric motor 47 is installed in the motor case 48.

As is seen from FIG. 1, the right end of the second screw rod member 44 is rotatably held by the motor case 48 through a bush 53. The worm wheel 46 is integral with the second screw rod member 44 and rotatably held in the motor case 48 through a pair of thrust bearings 54. An annular bearing retainer 55 is screwed into the motor case 48 to properly hold the worm wheel 46 in the motor case 48.

The detail of the bracket unit 45 will be described in detail with the aid of FIG. 2.

As is seen from the drawing, the bracket unit 45 comprises a first bracket part 50 that is integral with a lower portion of the panel 18 and a second bracket part 49 that is connected to the first bracket part 50.

As is seen from FIG. 5, the first bracket part 50 is generally U-shaped and welded at its upper end to a lower portion of the inner jacket 3b. On a lower surface of the first bracket part 50, there is defined a first mounting surface 50a that is flat and generally in parallel with the axis of the inner jacket 3b. Although not shown in the drawings, the first mounting surface 50a is formed with two threaded openings for the reason which will become apparent hereinafter.

While, as is seen from FIG. 2, the second bracket part 49 comprises a mounting portion 49a that extends in a direction perpendicular to the axis of the jacket unit 3 and a pair of side wall portions 49f that extend leftward from opposed ends of the mounting portion 49a.

As is seen from FIGS. 2 and 3B, a flat surface 49b of the mounting portion 49a to which the first mounting surface 50a of the first bracket part 50 intimately contacts is formed with two elongate slots 49c that extend in a direction perpendicular to the axis of the jacket unit 3.

Figure 8:
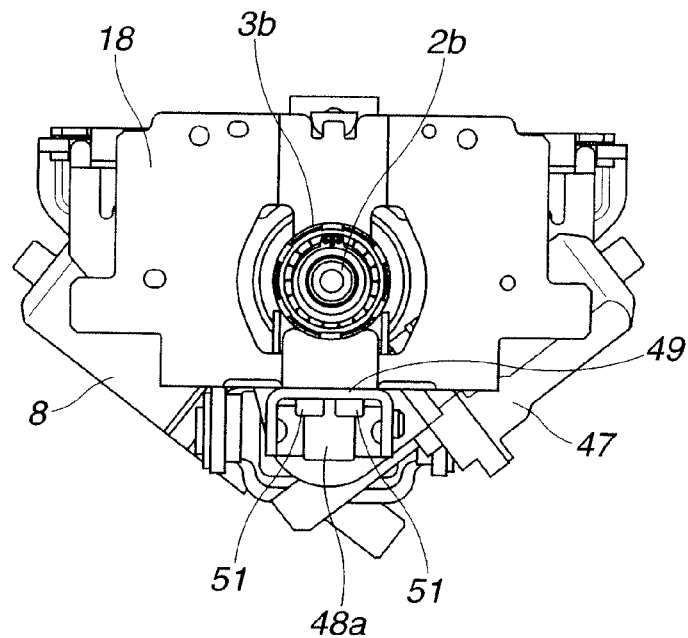
FIG. 8 is a view taken from the direction of the arrow "A" of FIG. 6.

For securing the second bracket part 49 to the first bracket part 50, two connecting bolts 51 are used which are passed through the elongate slots 49a and screwed into the threaded openings of the first mounting surface 50a of the first bracket part 50. Because of the shape of the elongate slots 49c, positioning of the second bracket part 49 relative to the first bracket part 50 in a direction perpendicular to the axis of the jacket unit 3 is adjustable. The arrangement of the connecting bolts 51 relative to the second bracket part 49 is also shown in FIG. 8 that is a view taken from the direction of the arrow "A" of FIG. 6.

As is seen from the drawing (viz., FIG. 2), the paired wall portions 49f of the second bracket part 49 have mutually facing second mounting surfaces 49d between which a rounded projection 48a of the motor case 48 is pivotally put. For this putting, the rounded projection 48a has opposed surfaces 48b that slidably contact with the second mounting surfaces 49d respectively. The rounded projection 48a is formed with an opening 48c.

The paired wall portions 49f of the second bracket part 49 are respectively formed with elongate slots 49e each extending in a vertical direction in FIG. 2.

Figure 9:
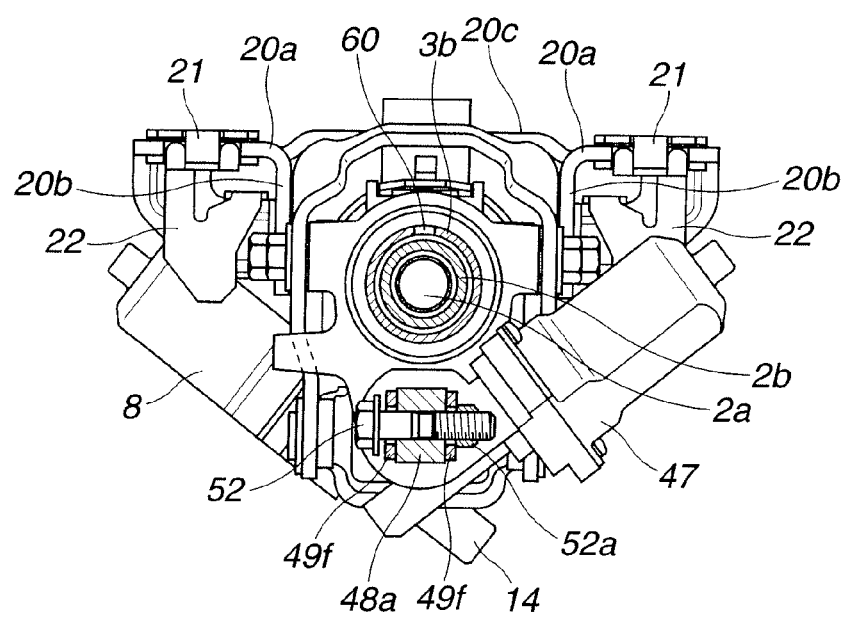
FIG. 9 is a view taken along the line "B-B" of FIG. 6.

As is seen from FIGS. 2 and 3A, for the pivotal connection of the rounded projection 48a to the paired wall portions 49f, a bolt 52 is used which is passed through the elongate slots 49e of the second bracket part 49 and the opening 48c of the rounded projection 48a and retained by a nut 52e. The pivotal connection of the rounded projection 48a to the paired wall portion 49f through the bolt 52 is also shown in FIG. 9 that is a view taken along the line "B-B" of FIG. 6.

In the following, operation of the electrically powered tilt steering device of the present invention that has the above-mentioned structure will be described with the aid of the drawings.

First, operation of the tilting mechanism 19 will be described with reference to the drawings, especially FIGS. 5 and 6.

When the electric motor 8 (see FIG. 6) is energized, the first screw rod member 7 is turned about its axis in one or the other direction. Thus, the nut member 9 (see FIG. 5) operatively engaged with the first screw rod member 7 is forced to move axially or straightly on and along the rod member 7 in one or other direction. With the aid of the link member 34, the axial movement of the nut member 9 induces a pivotal movement of the U-shaped swing arm 6 (see FIG. 6) in one or other direction relative to the fixed U-shaped upper bracket 20. That is, the U-shaped swing arm 6 is forced to pivot about a common axis that the second pivot shafts 5 (see FIG. 4) have. During this, the pivotal connection between the U-shaped swing arm 6 and the outer jacket 3a induces a pivotal movement of the jacket unit 3 about the fixed first pivot shaft 4 in one or the other direction.

As will be understood from FIG. 5, when the electrically powered tilt steering device of the invention is properly installed in a motor vehicle having the steering wheel SW oriented to face a driver, the pivotal movement of the jacket unit 3 about the fixed first pivot shaft 4 induces a tilting movement of the jacket unit 3 in a vehicle cabin. That is, due to the tilting movement of the jacket unit 3, the vertical height of the steering wheel SW changes.

When the steering wheel SW comes to a desired angular position (or desired height), energization of the electric motor 8 is stopped. Upon this, the desired angular position of the steering wheel SW relative to the vehicle body is kept.

As is seen from FIG. 1, the leftward movement of the nut member 9 is regulated by a right end of the tubular stopper member 40 and the rightward movement of the nut member 9 is regulated by a left end of the shaft supporting portion 3c of the outer jacket 3a.

Next, operation of the telescopic mechanism 41 will be described with reference to the drawings, especially FIGS. 2, 3A, 3B, 4, 5, 6 and 7.

When, as will be seen from FIGS. 2, 3A and 5, the electric motor 47 is energized, the second screw rod member 44 is turned about its axis in one or the other direction. As is seen from FIG. 5, since the second screw member 44 is operatively engaged with the nut 43 (28) fixed to the outer jacket 3a, the turning of the second screw rod member 44 about its axis induces axial movement of the rod member 44 relative to the fixed nut 43.

As is seen from FIG. 5, because of the connection between the second screw rod member 44 and the inner jacket 3b through the above-mentioned motor case 48 and bracket unit 45, the axial movement of the second screw rod member 44 induces an axial movement of the inner jacket 3b relative to the outer jacket 3a. The axial movement of the inner jacket 3b induces a simultaneous axial movement of the outer hollow shaft 2b relative to the inner solid shaft 2a. That is, a telescopic movement of the inner jacket 3b relative to the outer jacket 3a and another telescopic movement of the outer hollow shaft 2b relative to the inner solid shaft 2a are simultaneously carried out.

When the steering wheel SW mounted to the top of the outer hollow shaft 2b comes to a desired position, energization of the electric motor 47 is stopped. Upon this, the desired position of the steering wheel SW relative to the inner solid shaft 2a is kept.

In the following, steps for assembling the reciprocatively actuating mechanism 24 will be described with the aid of FIG. 1.

First, a motor unit is assembled in advance. That is, the speed reduction unit (viz., worm and worm wheel 13) and the electric motor 8 are installed in the motor case 14. The bearing retainer 29 is thrust into the motor case 14 to properly hold the worm wheel 13, and one end of the tubular stopper member 40 is put into the bearing retainer 29. With these steps, the motor unit is assembled.

Then, the radial bearing 27 is set in the shaft supporting portion 3c of the outer jacket 3a. Then, a left portion of the first screw rod member 7 is inserted into the tubular stopper member 40 of the motor unit to achieve the spline connection between the splined cylindrical inner surface 7a of the rod member 7 and the splined cylindrical outer surface 12a of the output shaft 12 of the worm wheel 13.

Then, by reducing an entire length of a unit that includes the motor unit and the first screw rod member 7 (which is made possible by the spline connection between the first screw rod member 7 and the output shaft 12), the right end of the rod member 7 is thrust into the radial bearing 27 set in the shaft supporting portion 3c of the outer jacket 3a. Then, the C-ring 11 is set to the right end of the rod member 7. Then, the motor case 14 is connected to the outer jacket 3a through the bolt 31.

Then, the bearing retainer 28 is screwed into the shaft supporting portion 3c from a right open end.

With these steps, an arrangement is established wherein the right end of the first screw rod member 7 is rotatably held by the shaft supporting portion 3c of the outer jacket 3a without being permitted to make an axial displacement and the left end of the rod member 7 is connected with the output shaft 12 of the worm wheel 13 through the spline connection.

In the following, advantages of the present invention will be described.

As is mentioned hereinabove, in the invention, one end of the first screw rod member 7 is connected to the output shaft 12 of the worm wheel 13 through a spline connection (viz., the connection between 7a and 12a) that permits an axial movement relative to each other.

Accordingly, the first screw rod member 7 is suppressed from being applied with a marked compressive force, and thus, unlike in the above-mentioned conventional case, the first crew rod member 7 is suppressed from being applied with a marked rotational resistance. Furthermore, even when, due to a collision of a driver against the steering wheel upon a vehicle collision or the like, a marked force is applied to the first screw rod member 7 through the swing arm 6 and the nut member 9, the force is not directly transmitted to the motor case 14 because of provision of the spline connection and thus the electric motor 8 in the case 14 is protected.

In the present invention, an arrangement is positively employed wherein the electric motor 8 and the speed reduction unit are installed in the motor case 14. Thus, a motor unit can be prepared in advance that includes the motor case 14, the electric motor 8 and the speed reduction unit. Thus, the work for assembling the electrically powered tilt steering device of the invention is easily carried out with reduced assembling steps. Furthermore, due to usage of the spline connection between the first screw rod member 7 and the output shaft 12 of the worm wheel 13, the entire length of a unit that includes the rod member 7 and the output shaft 12 can be reduced when needed, which facilitates the work for mounting the rod member 7 and motor case 14 to the jacket unit 3.

Due to usage of the speed reduction unit including the worm and worm wheel 13, the electric motor 8 is suppressed from being driven by an external force.

In the foregoing description, explanation is so made that the reciprocatively actuating mechanism 24 is applied to an electrically powered tilt steering device of a type that is equipped with the telescopic mechanism 41. However, if desired, the mechanism 24 may be applied to an electrically powered tilt steering device of a type that is not equipped with such telescopic mechanism.

The entire contents of Japanese Patent Application 2007-271937 filed Oct. 19, 2007 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. An electrically powered tilt steering device of a motor vehicle, comprising:
    a jacket unit that rotatably receives therein a steering shaft, the jacket unit being pivotable relative to a vehicle body through a first pivot mechanism;
    a swing arm that is pivotably connected to the vehicle body through a second pivot mechanism, a first free part of the swing arm being pivotably connected to the jacket unit;
    a first screw rod member rotatably held by the jacket unit, the first screw rod member having a hollow end portion with a splined cylindrical inner surface;
    a nut member operatively engaged with the first screw rod member such that rotation of the first screw rod member about an axis thereof induces a movement of the nut member on and along the first screw rod member, the nut member being pivotably connected to a second free part of the swing arm;
    an electric actuator held by the jacket unit and including an output shaft that has an end portion with a splined cylindrical outer surface, and
    a holding structure that rotatably holds a second end portion of the first screw rod member on the jacket unit and restrains an axial movement of the first screw rod member,
    wherein the splined cylindrical inner surface of the first screw rod member engages the splined cylindrical outer surface of the output shaft such that the first screw rod member is rotatable by the output shaft, and such that the first screw rod member is axially movable relative to the output shaft.

2. An electrically powered tilt steering device as claimed in claim 1, wherein the output shaft of the electric actuator comprises a speed reduction unit driven by an electric motor.

3. An electrically powered tilt steering device as claimed in claim 2, wherein the speed reduction unit and the electric motor are installed in a motor case that is connected to the jacket unit.

4. An electrically powered tilt steering device as claimed in claim 3, wherein the motor case is pivotably connected to the jacket unit by a single bolt.

5. An electrically powered tilt steering device as claimed in claim 3, wherein the speed reduction unit comprises:
    a worm formed on an output part of the electric motor; and
    a worm wheel meshed with the worm, the worm wheel being coaxially connected to the output shaft.

6. An electrically powered tilt steering device as claimed in claim 1, wherein the holding structure comprises:
    a radial bearing fixed to the jacket unit;
    an annular ridge formed on an end portion of the first screw rod member and contacting a first end surface of the radial bearing, the annular ridge being configured to restrain an axial movement of the first screw rod member in a direction away from the output shaft of the electric actuator; and
    a C-ring held by the end portion of the first screw rod member and contacting a second end surface of the radial bearing, the C-ring being configured to restrain an axial movement of the first screw rod member in a direction toward the output shaft of the electric actuator.

7. An electrically powered tilt steering device as claimed in claim 6, wherein the holding structure comprises:
    a shaft supporting portion provided on the jacket unit, the shaft supporting portion having an opening;
    a radial bearing fitted in the opening of the shaft supporting portion and rotatably holding the end portion of the first screw rod member; and
    an annular bearing retainer screwed into the opening of the shaft supporting portion, the annular bearing retainer having a surface against which an end of the first screw rod member abuts.

8. An electrically powered tilt steering device as claimed in claim 1, wherein the jacket unit comprises:
    an outer jacket; and
    an inner jacket that is telescopically connected with the outer jacket, the inner jacket rotatably receiving the steering shaft and being axially movable together with the steering shaft.

9. An electrically powered tilt steering device as claimed in claim 8, further comprising a telescopic mechanism configured to telescopically move the inner jacket relative to the outer jacket using electric power.

10. An electrically powered tilt steering device as claimed in claim 9, wherein the telescopic mechanism comprises:
    a threaded opening formed in the holding structure;
    a second screw rod member operatively engaged with the threaded opening, the second screw rod member being configured such that rotation of the second screw rod member about its axis induces an axial movement of the second screw rod member relative to the holding structure;
    an elongate opening provided in the first screw rod member, the elongate opening receiving a leading end portion of the second screw rod member;
    an additional electric actuator held by the inner jacket via a bracket unit, the additional electric actuator being configured to drive the second screw rod member using a speed reduction unit.

11. An electrically powered tilt steering device of a motor vehicle, comprising:
    a jacket unit that rotatably receives therein a steering shaft, the jacket unit including an outer jacket that is pivotable relative to a vehicle body through a first pivot mechanism and an inner jacket that is telescopically connected with the outer jacket;

a swing arm that is pivotably connected to the vehicle body through a second pivot mechanism, a first free part of the swing arm being pivotably connected to the outer jacket of the jacket unit;

a first screw rod member rotatably held by the outer jacket of the jacket unit, the first screw rod member having a hollow end portion with a splined cylindrical inner surface;

a nut member operatively engaged with the first screw rod member so that rotation of the first screw rod member about an axis thereof induces a movement of the nut member on and along the first screw rod member, the nut member being pivotably connected to a second free part of the swing arm;

a holding structure for rotatably holding one end of the first screw rod member on the outer jacket of the jacket unit;

an electric actuator held by the outer jacket of the jacket unit and including an output shaft that has an end portion with a splined cylindrical outer surface, the splined cylindrical inner surface of the first screw rod member being operatively engaged with the splined cylindrical outer surface of the output shaft such that the first screw rod member is rotatable by the output shaft, and such that the first screw rod member is axially movable relative to the output shaft;

a threaded opening formed in the holding structure;

a second screw rod member operatively engaged with the threaded opening, the second screw rod member being configured such that rotation of the second screw rod member about its axis induces an axial movement of the second screw rod member relative to the holding structure;

an elongate opening provided in the first screw rod member the elongate opening receiving a leading end portion of the second screw rod member;

an additional electric actuator held by the inner jacket of the jacket unit through a bracket unit, the additional electric actuator being configured to drive the second screw rod member using a speed reduction unit.

* * * * *